Dec. 18, 1928.　　　　　　　　　　　　　　　　　　1,695,316
R. J. BURKE
CHECK LINK FOR SCALES
Filed June 8, 1927　　　　2 Sheets-Sheet 1
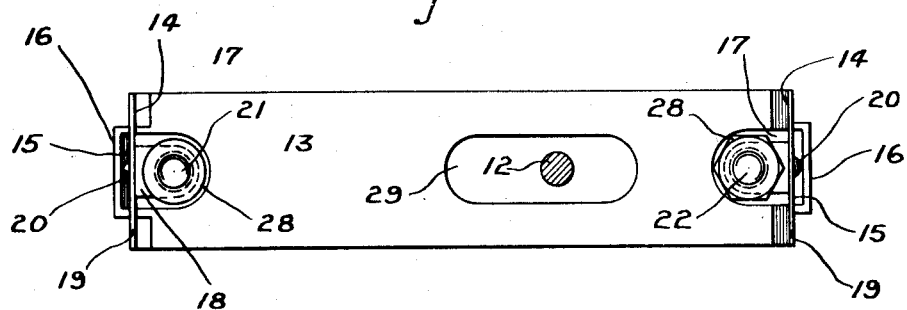
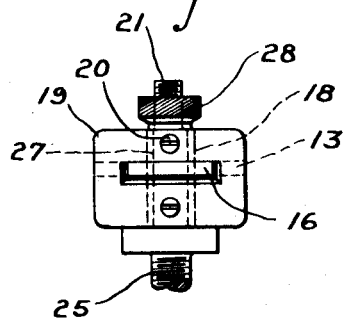
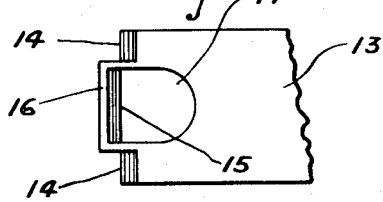
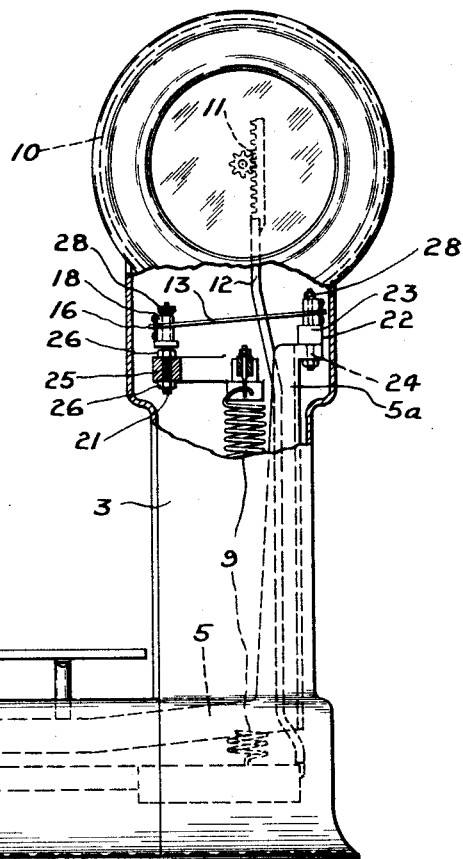
INVENTOR
Robert J. Burke,
by his atty.

Dec. 18, 1928. R. J. BURKE 1,695,316
CHECK LINK FOR SCALES
Filed June 8, 1927 2 Sheets-Sheet 2
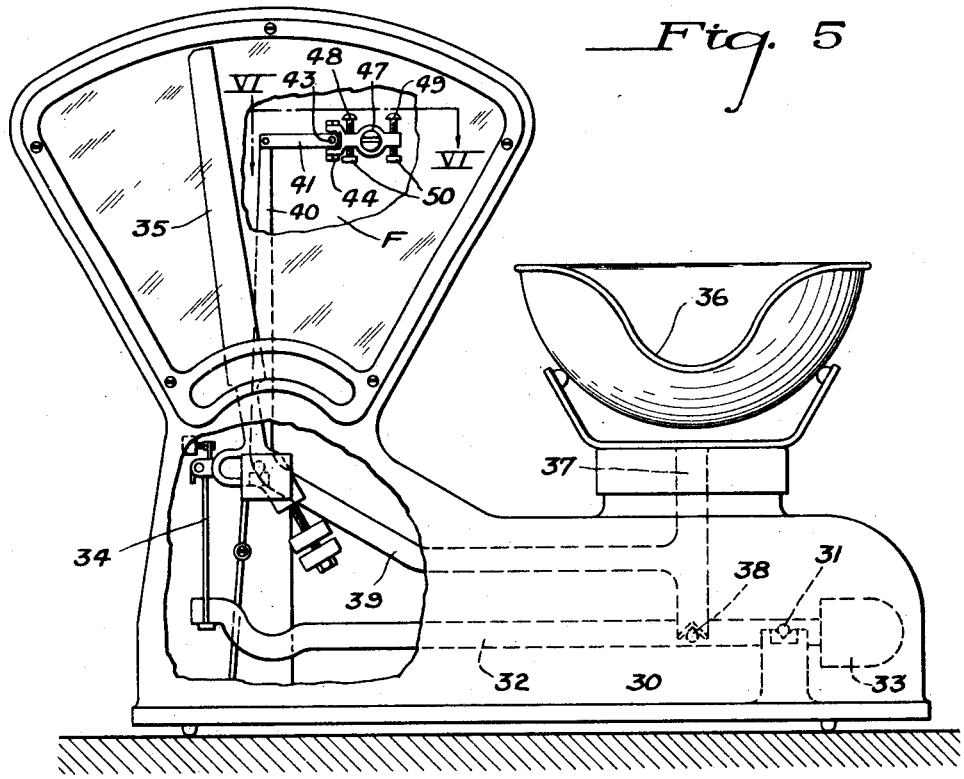
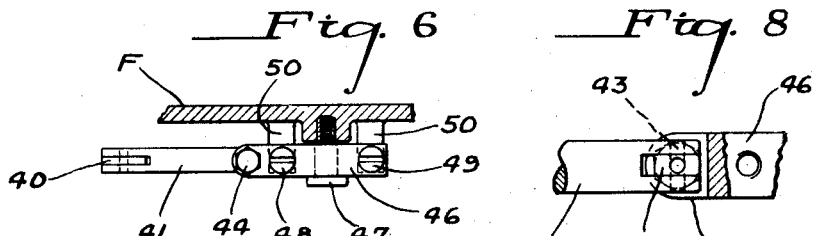
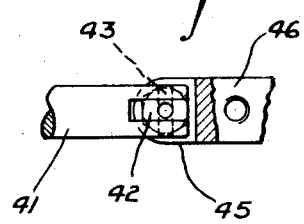
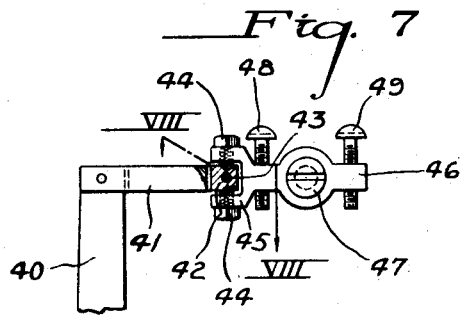

Patented Dec. 18, 1928.

1,695,316

UNITED STATES PATENT OFFICE.

ROBERT J. BURKE, OF PITTSBURGH, PENNSYLVANIA, ASSIGNOR TO LINCOLN SCALE CORPORATION, OF PITTSBURGH, PENNSYLVANIA, A CORPORATION OF DELAWARE.

CHECK LINK FOR SCALES.

Application filed June 8, 1927. Serial No. 197,399.

This invention relates to scales, and particularly to an improved construction in check links therefor.

Lever scales generally employ a check arm mounted on the scale lever and carrying the load pan or platform. In order to maintain the pan or platform level at all times and to guide the check arm, a check link is provided. This link must be carefully made and fitted so that it will not bind and interfere with the operation of the scale. The knife edges on which the several parts of the scale are pivoted are arranged with stop blocks so as to prevent relative sidewise movement of the check arm scale lever and associated parts, as such sidewise movement would, in all probability, cause binding of the check link.

When a scale is boxed for shipment, it is desirable to remove the stop blocks and separate the bearing members from their corresponding knife edges, as otherwise the knife edges would be damaged in shipment. There is, therefore, considerable danger, when a scale is set up, of the check arm being carelessly twisted or displaced, and thus permanently distorting the check link.

I provide a check link making a universal joint connection with the check arm and the frame. The check link is preferably pivoted on blocks, one secured to the frame and one to the check arm. These blocks are arranged for rotation sidewise of the direction of movement of the check link. In certain cases a universal connection need be provided at only one end of the check link.

In the accompanying drawings which illustrate the preferred embodiment of my invention, and one modification thereof, Figure 1 is a side elevation partly broken away, of a spring platform scale of the drum type, Figure 2 is a top plan view of the check link with its connecting members, Figure 3 is an end elevation of the structure shown in Figure 2, Figure 4 is a top plan view of one end of the check link, Figure 5 is a front elevation partly broken away of a fan type scale embodying the invention, Figure 6 is a horizontal section taken on the line VI—VI of Figure 5, Figure 7 is a side elevation partly broken away of the apparatus shown in Figure 6, and Figure 8 is a horizontal section taken on the line VIII—VIII of Figure 7.

Figure 1 shows a scale comprising a base 2, and a column 3 carrying the scale platform 4, and the weighing mechanism. The platform 4 is mounted on a check arm 5. The check arm is carried on knife edges 6 by a main lever 7. The main lever is pivoted on knife edges at 8 and is supported at its outer end by a load spring 9. The weight is indicated by a drum 10 operated by a rack and pinion 11 through a rack bar 12.

The check arm 5 has a portion 5$^a$ extending upwardly within the column. It is connected through a check link 13 to the scale frame—that is to say, to the column 3.

The check link is provided at each end with knife edge portions 14 and 15 in substantial alignment with one another. The knife edge portions 14 are directed outwardly while the knife edge portion 15 carried by an extension 16 of the check link is directed inwardly and faces an opening 17 formed in the link. The knife edge portion 15 bears against a side face of a block 18. A plate 19 is secured to this face by screws 20 and the knife edge portions 14 bear against the plate. The block 18 lies within the opening 17 provided in the check link. The construction at each end of the check link is the same.

The blocks 18 are mounted on studs 21 and 22. The stud 22 has a collar 23 and a downwardly extending threaded portion 24 by which it is secured to the top of the check arm 5. The stud 21 has a downwardly extending threaded portion 25 extending through a frame bracket, and provided above and below such bracket with nuts 26. This permits of adjusting the vertical position of one end of the check link so that it lies parallel with a plane passing through the knife edges 6 and 8, and thus insuring proper operation of the scale. Each of the studs 21 and 22 is provided with a smooth shouldered portion 27 topped by a nut 28. The blocks 18 are arranged for free rotation on the shouldered portions 27.

There is no danger of the knife edge portions 14 and 15 becoming bent or distorted in assembling the scale, or in setting it up after shipment. If the check arm 5 is inadvertently displaced sidewise, one or the other of the knife edge portions 14 and 15 bears against the blocks 18 or the plates 19 and causes the blocks 18 to rotate about their supporting studs. The scale therefore always operates freely and is not likely to lose its accuracy.

It will be noted from Figure 2 that the check link is provided with an opening 29 to accommodate the rack bar 12. This opening is made considerably wider than the rack bar so that the parts will not interfere at any time.

Figures 5 to 8 inclusive show the invention applied to a fan type scale, such as is used for weighing candy and the like. This scale comprises a base 30 carrying bearings for knife edges 31 of a main lever 32. The main lever 32 carries the customary counter weight 33 and link 34 by which it is connected to a weight indicator 35. The load carrying member is a pan 36 mounted on a post 37. The post 37 is carried on knife edges 38 on the main lever 32. It is provided with a sidewise extending arm 39 forming the check arm of the scale. The check arm has an upwardly extending portion 40 which at its top is pivotally connected to a check link 41. The check link 41 is forked at each end, as best shown in Figures 6 and 8. One of these forked ends makes pivotal connection with the upstanding end 40 of the check arm 39. The other forked end embraces a block 42 and is pivotally connected thereto by a pin 43. The block 42 is in turn pivotally mounted on the cone points of screws 44 passing through spaced arms 45 on a bracket 46. The check link is adapted to swing about the block 42 on a horizontal axis, while the block, in turn, is arranged to swing about a vertical axis. This provides a universal connection for one end of the check link.

The bracket 46 is carried by a shouldered bolt 47 threaded into the frame F of the scale. Screws 48 and 49, one on each side of the screw 47, pass through the bracket 46 and engage lugs 50 formed on the frame F. This provides a means for varying the normal angularity of the check link 41 so as to place it in parallelism with a line passing through the knife edges 31 and 38, as is required for proper scale action. If it is desired to raise the pivot pin 43, the screw 49 is backed off in its threaded opening and the screw 48 is threaded further in. If it is desired to lower the pivot pin 43, the screws are turned in the reverse direction.

It is found in practice that the above described arrangement permits universal movement of the check link relative to the frame and the check arm. In certain types of scales it is desirable to provide a universal joint at each end of the check link as in the embodiment of Figures 1 to 4.

While I have illustrated and described certain preferred forms of my invention, it will be understood that it may be otherwise embodied within the scope of the following claims.

I claim:—

1. In a scale, a check arm, a frame, a block pivotally mounted on the frame, and a check link rockable on the block.

2. In a scale, a check arm, a frame, studs carried by the check arm and the frame, sleeves on the studs, and a check link pivotally mounted on the sleeves.

3. In a scale, a check arm, a frame, studs carried by the check arm and the frame, sleeves on the studs, and a check link pivotally mounted on the sleeves, one of the studs being adjustable so as to change the normal inclination of the check link.

4. In a scale, a universally movable check link, and a scale member, the check link having an opening therethrough of greater dimensions than the scale member, the scale member passing through the opening.

5. In a scale, a universally movable check link, and a rack bar, the check link having an opening therethrough of greater dimensions than the rack bar, the rack bar extending through said opening.

6. In a scale, a frame, a block, means for adjusting the position of the block relative to the frame, and a check link making universal connection with the frame through the block.

In testimony whereof I have hereunto set my hand.

ROBERT J. BURKE.